(12) United States Patent
Brehob

(10) Patent No.: US 7,685,996 B2
(45) Date of Patent: Mar. 30, 2010

(54) SYSTEM AND METHOD TO CONTROL PRE-IGNITION IN AN INTERNAL COMBUSTION ENGINE

(75) Inventor: Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 487 days.

(21) Appl. No.: 11/624,892

(22) Filed: Jan. 17, 2007

(65) Prior Publication Data
US 2009/0101111 A1   Apr. 23, 2009

Related U.S. Application Data

(63) Continuation of application No. 11/216,978, filed on Aug. 31, 2005, now Pat. No. 7,178,503.

(51) Int. Cl.
*F02P 5/04* (2006.01)
*F02P 5/00* (2006.01)
(52) U.S. Cl. .................................. 123/406.47
(58) Field of Classification Search ................ 123/304, 123/305, 478, 295, 406.47, 406.59, 435; 73/35.09, 35.08, 35.12
See application file for complete search history.

(56) References Cited

U.S. PATENT DOCUMENTS 6,883,497 B2 *  4/2005  Wozniak et al. ........ 123/406.26

2005/0072402 A1 *  4/2005  Zurloye et al. ............... 123/304

FOREIGN PATENT DOCUMENTS

JP  07259620 A  * 10/1995
JP  2002339780 A  * 11/2002

OTHER PUBLICATIONS

JP2002339780 (Hiratani et al.) Nov. 27, 2002 (machine translation). [online] [retrieved on May 12, 2009]. Retrieved from JPO database.*
Inoue, K., Takei, K., Yoshida, K, shoji, H., and Yamazaki A., "Effect of EGR-Induced Hot Residual Gas on Combustion When Operating a Two-Stroke Engine on Alcohol Fuels," SAE Paper 2000-01-2972, 2000.

* cited by examiner

*Primary Examiner*—Mahmoud Gimie
(74) *Attorney, Agent, or Firm*—Julia Voutryas; Brooks Kushman P.C.

(57) ABSTRACT

An engine system and method are disclosed for controlling pre-ignition of an alcohol fuel. In one embodiment, the fuel injection timing is adjusted to cause the fuel to avoid combustion chamber surfaces. In another embodiment, the fuel injection timing is adjusted to spray the fuel directly onto the piston surface to cool the piston. Also disclosed is a cylinder cleaning cycle in which engine knock is purposely caused for one to hundreds of engine cycles by adjusting the fuel content away from alcohol toward gasoline. Further measures to cause knock which are disclosed: adjusting spark timing, intake boost, exhaust gas fraction in the cylinder, cam timing, and transmission gear ratio.

7 Claims, 3 Drawing Sheets

SYSTEM AND METHOD TO CONTROL PRE-IGNITION IN AN INTERNAL COMBUSTION ENGINE

CROSS-REFERENCE TO RELATED APPLICATION

The present application is a continuation of commonly owned U.S. Pat. No. 7,178,503 B1, issued 20 Feb. 2007.

FIELD OF INVENTION

The present invention relates to controlling pre-ignition in internal combustion engines.

BACKGROUND OF THE INVENTION

Alcohol fuels are known to have a high octane number, which inhibits autoignition (also known as knock; knock is self ignition of end gases ahead of the flame front occurring after spark firing) in spark-ignited internal combustion engines. This allows an internal combustion engine to be operated at a higher compression ratio and/or a higher level of pressure charging in the intake system. However, alcohol fuels are prone to pre-ignition, which is a combustion phenomenon occurring prior to spark plug firing. It is believed to be a surface phenomenon where the fuel comes in contact with a hot spot in the combustion chamber, such as the spark plug tip, a bit of carbon deposit, the piston top, and exhaust valve, and initiates a flame front. This can lead to damage of the engine because it can become a runaway problem. That is, when pre-ignition first occurs, the early combustion leads to very high in-cylinder temperatures and high heat transfer to combustion chamber surfaces. Then, in succeeding cycles, pre-ignition is even more likely and happens earlier in the compression stroke making the temperatures even higher. If left unchecked, high temperatures can lead to engine parts melting and complete failure of the engine. It is known in the art to undertake measures to mitigate pre-ignition.

SUMMARY OF THE INVENTION

The inventor of the present invention has recognized that spark-ignited engines with direct injection, i.e., those in which fuel is sprayed into the cylinder directly, have more control over the injection of the fuel into the cylinder than conventional port fuel injected engines. A method is disclosed in which the injection timing of the direct injector is adjusted to avoid pre-ignition. This adjustment can be based on detection of pre-ignition by a flywheel speed sensor, an accelerometer coupled to the engine, an ionization sensor coupled to the cylinder, a pressure sensor coupled to the engine, or other sensor. Alternatively, pre-ignition is determined open loop, meaning that the engine conditions at which pre-ignition occurs are determined experimentally. When such conditions are accessed by the engine, the engine control unit adjusts the fuel injection timing to avoid the pre-ignition. Beyond engine operating conditions such as speed, torque, engine coolant temperature, intake air temperature, and exhaust gas recirculation (EGR) fraction, other factors affecting the propensity to pre-ignite are: fuel properties and humidity. Fuel properties comprise, for example, the fraction of alcohol in the fuel, the type of alcohol, or alcohols, and the properties of the diluent fuel, e.g., gasoline.

The inventor of the present invention recognizes two strategies to mitigate pre-ignition. In one method, fuel is injected into the cylinder to avoid contact with the surface as much as possible. This is accomplished by injecting the fuel when the piston is at its farthest position from the fuel injector, i.e., BDC. As injection occurs over a range of piston positions, the fuel injection begins prior to the piston reaching BDC and concludes after the piston passes BDC, approximately centering the injection duration at BDC. This provides the least opportunity for the fuel to hit the piston's surface as well as bouncing off the piston top and spraying onto other hot combustion chamber surfaces such as exhaust valves or spark plug tips. Further, the fuel is predominantly in contact with the air, thus, absorbing the energy for its phase change from liquid to gaseous from the air. Cooling of the charge provides two advantages: reducing the density of the air in the cylinder allowing more air to be inducted and thus more power produced in the cylinder; and prevention of endgas autoignition or knock. In a second method, fuel is intentionally injected onto the piston top. The evaporation of the fuel from the piston top provides cooling of that surface and mitigates pre-ignition. To spray onto the piston, fuel is injected early on the intake stroke, a downward stroke of the piston. Alternatively, fuel is injected late on the compression stroke, an upward stroke of the piston. Injecting during the intake stroke allows sufficient time for air-fuel mixing; whereas, mixing time is limited when injection occurs during compression.

The present invention can be used in a dual-fuel engine where one fuel is predominantly alcohol and the other fuel is predominantly gasoline. Preferably, the alcohol fuel is injected into the cylinder directly and the gasoline fuel is injected into the intake port. Because the alcohol fuel has a higher resistance to knock, it is used either exclusively, or predominantly, when the operating condition has a high propensity to knock. However, a problem arises when the alcohol fuel is pre-igniting. However, if the gasoline fuel is used, knock occurs. The inventor of the present invention recognizes that one to possibly several hundred cycles of knock is not damaging to the engine, with the only drawback being an objectionable noise. Thus, it is disclosed that in such a situation, either all cylinders, or preferably only the cylinder or cylinders that are suffering from pre-ignition be caused to knock. It is known that knock causes a high frequency pressure wave to develop in the cylinder and can act to remove cylinder deposits which may be causing the pre-ignition. By performing such an operation in only the cylinders that suffer from pre-ignition, the objectionable knocking sound is minimized. According to a further aspect of the invention, the purposeful knocking condition is indicated to the operator of the vehicle as a dashboard light, text display, sound, or any other known methods of driver information. Because most vehicle operators regard knock to be commonly associated with an engine problem, an operator indicator that the engine is undergoing a cleaning cycle reassures the operator that the knocking sound is intended and not an indication that action be taken.

The above advantages, other advantages, and features of the present invention will be readily apparent from the following detailed description of the preferred embodiments when taken in connection with the accompanying drawings.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
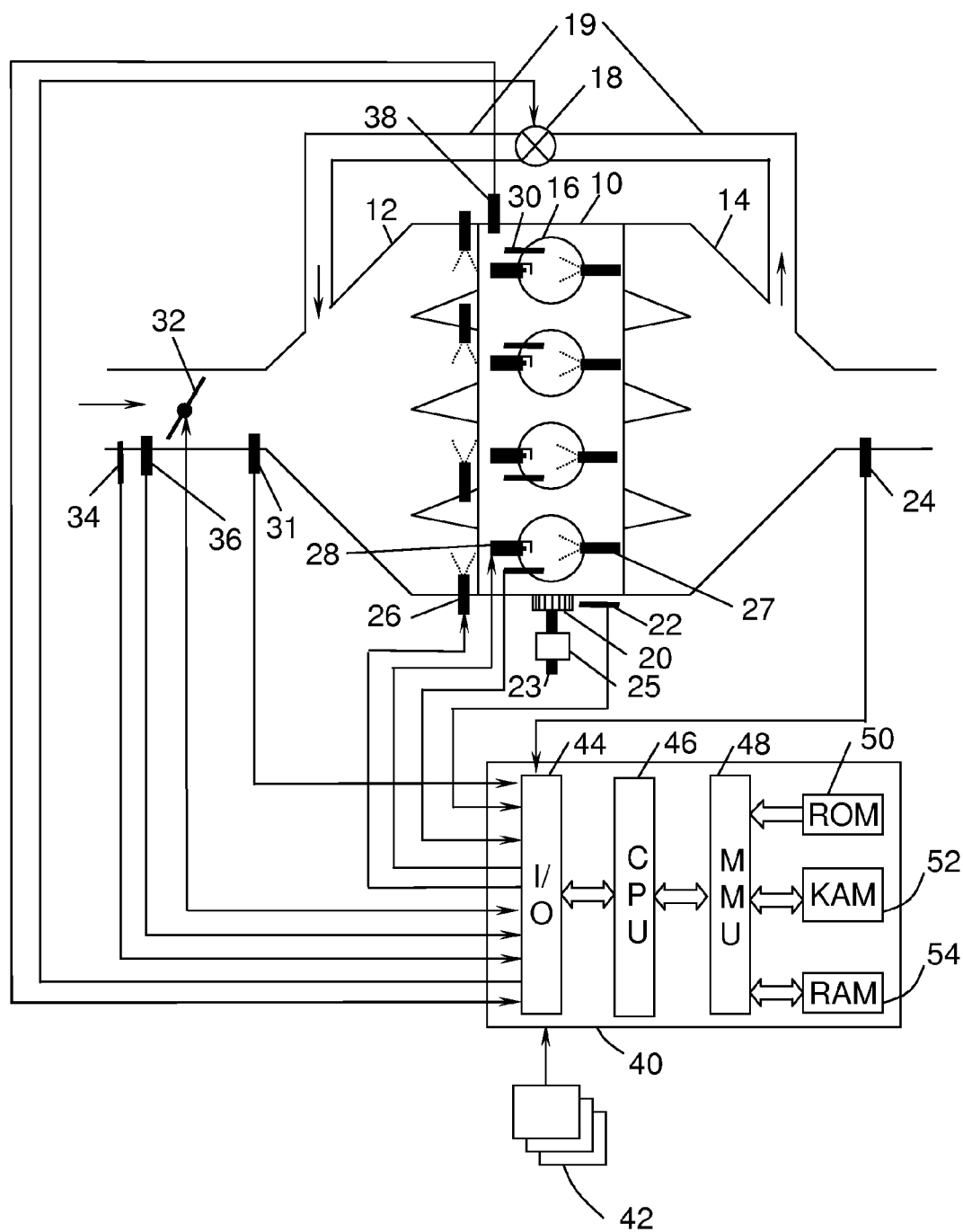
FIG. 1 is a schematic of a spark-ignited engine.

A 4-cylinder internal combustion engine 10 is shown, by way of example, in FIG. 1. Engine 10 is supplied air through intake manifold 12 and discharges spent gases through exhaust manifold 14. An intake duct upstream of the intake manifold 12 contains a throttle valve 32 which, when actuated, controls the amount of airflow to engine 10. Sensors 34 and 36 installed in intake manifold 12 measure air temperature and mass air flow (MAF), respectively. Sensor 31, located in intake manifold 14 downstream of throttle valve 32, is a manifold absolute pressure (MAP) sensor. A partially closed throttle valve 32 causes a pressure depression in intake manifold 12. When a pressure depression exists in intake manifold 12, exhaust gases are caused to flow through exhaust gas recirculation (EGR) duct 19, which connects exhaust manifold 14 to intake manifold 12. Within EGR duct 19 is EGR valve 18, which is actuated to control EGR flow. Fuel is supplied to engine 10 by port fuel injectors 26, by direct fuel injectors 27, or a combination of the two. In one embodiment, port fuel injectors provide a fuel which is predominantly gasoline and direct fuel injectors provide a fuel which is predominantly alcohol. Each cylinder 16 of engine 10 contains a spark plug 28. A pressure transducer 30 is shown installed in each cylinder 16. The crankshaft (not shown) of engine 10 is coupled to a toothed wheel 20. Sensor 22, placed proximately to toothed wheel 20, detects engine 10 rotation. Engine output shaft 23 coupled to the crankshaft of engine 10 is coupled to a transmission (not shown). An in-line torque sensor 35 is coupled to output shaft 23. Sensor 24, in exhaust manifold 14, is an exhaust gas component sensor. Exhaust gas component sensor 24 is an exhaust gas oxygen sensor. Alternatively, exhaust gas component sensor 24 is a wide-range oxygen sensor, a nitrogen oxide sensor, a hydrocarbon sensor, or other gas component sensor as may become available.

Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve 32 position, spark plug 26 timing, EGR valve 18. Various other sensors 42 (such as a humidity sensor, an engine block accelerometer, an ionization sensor, as examples) and specific sensors (engine speed sensor 22, in-line torque sensor 25, cylinder pressure transducer sensor 30, engine coolant sensor 38, manifold absolute pressure sensor 31, exhaust gas component sensor 24, air temperature sensor 34, and mass airflow sensor 36) communicate input through I/O interface 44 and may indicate engine rotational speed, vehicle speed, coolant temperature, manifold pressure, pedal position, cylinder pressure, throttle valve position, air temperature, exhaust temperature, exhaust stoichiometry, exhaust component concentration, and air flow. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 60 may contain multiple ROM 50, RAM 54, and KAM 52 coupled to MMU 48 or CPU 46 depending upon the particular application.

Figure 2:
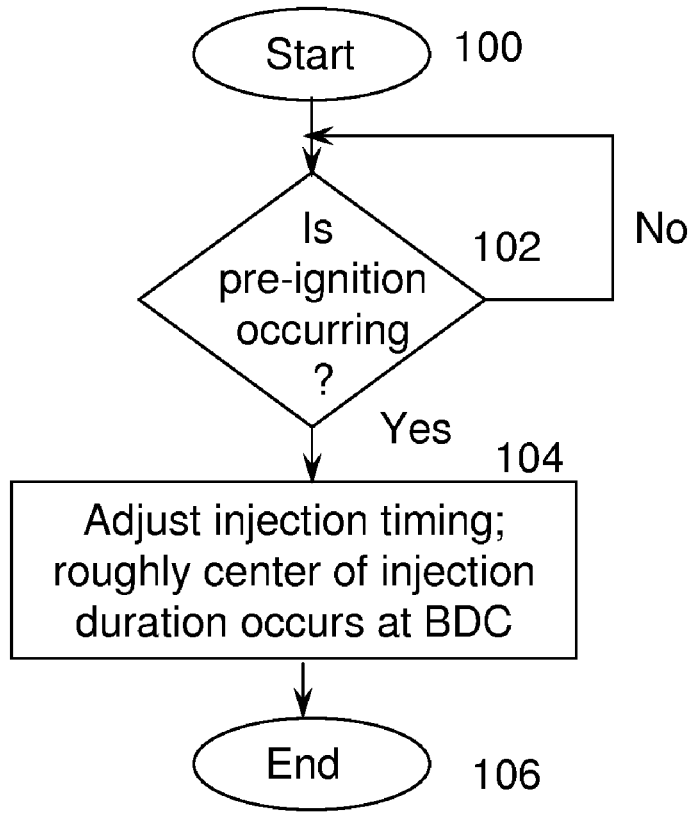
FIGS. 2-4 are flowcharts indicating various aspects of the present invention.

Referring to FIG. 2, the method begins in block 100 with the engine operating under normal conditions with an alcohol fuel and the injection timing is based on engine operating parameters other than pre-ignition. In block 102, occurrence of pre-ignition is evaluated. If no pre-ignition, normal engine operation continues. If pre-ignition is determined, control passes to block 104 in which injection timing of the alcohol injector is adjusted toward an injection interval which is roughly centered around bottom dead center (BDC) of its corresponding piston. E.g., if the injection interval is 40 degrees, injection would begin roughly at 160 degrees of crank rotation and continue through 200 degrees (180 degrees being BDC). If the injection interval is particularly long, it may be advantageous to being injection slightly ahead of the centered injection period simply to allow the fuel sufficient mixing time. By injecting near BDC, the fuel is less likely to contact the piston, or other cylinder surfaces, thereby avoiding surface ignition, or pre-ignition. After the adjustment is made in the injection timing in block 104, control passes through to block 106. The method shown in FIG. 2 is applied when the engine fuel is switched to alcohol containing fuel.

Figure 3:
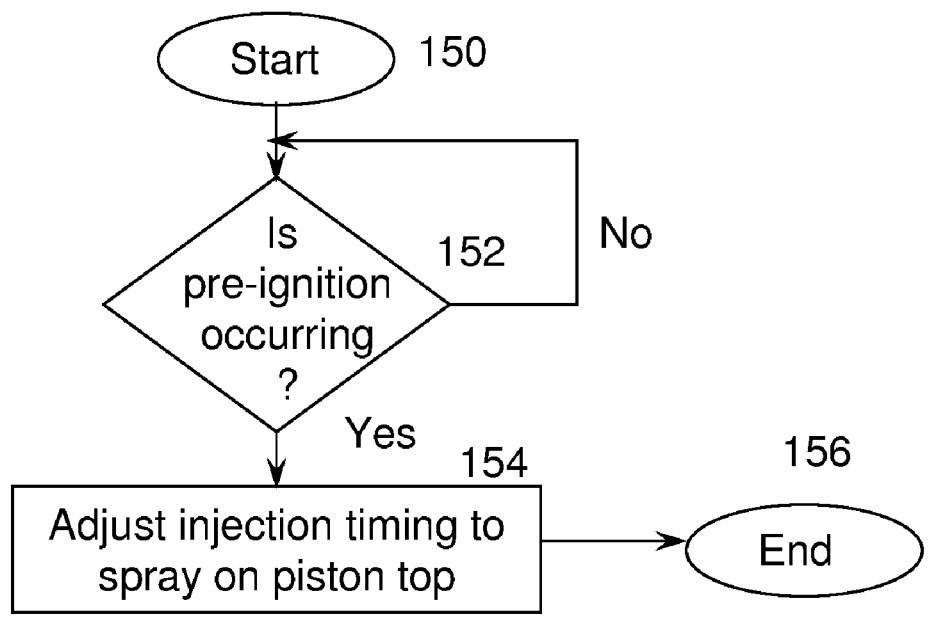

Referring to FIG. 3, the method, according to an aspect of the present invention, begins in block 150 with the engine operating under normal conditions with an alcohol fuel and injection timing based on engine operating parameters other than pre-ignition. In block 152, occurrence of pre-ignition is evaluated. If no pre-ignition, normal engine operation continues. If pre-ignition is determined, control passes to block 154 in which the injection timing of the alcohol injector is adjusted toward an injection interval causing the fuel to spray directly on the piston. Because the path by which heat transfers from the piston is primarily through piston rings, the piston top is known to operate at a higher temperature than most other combustion chamber surfaces. Therefore, the piston top is often the culprit leading to pre-ignition. Thus, according to an aspect of the present invention, the alcohol fuel is sprayed directly onto the piston surface. Alcohol fuels are known to have a high latent heat of vaporization, i.e., approximately five times that of gasoline on a per energy basis. By spraying the fuel directly onto the piston, the piston is cooled and doesn't develop hot spots. The method of FIG. 3 is applied in response to the engine fuel being switched to alcohol containing fuel.

Figure 4:
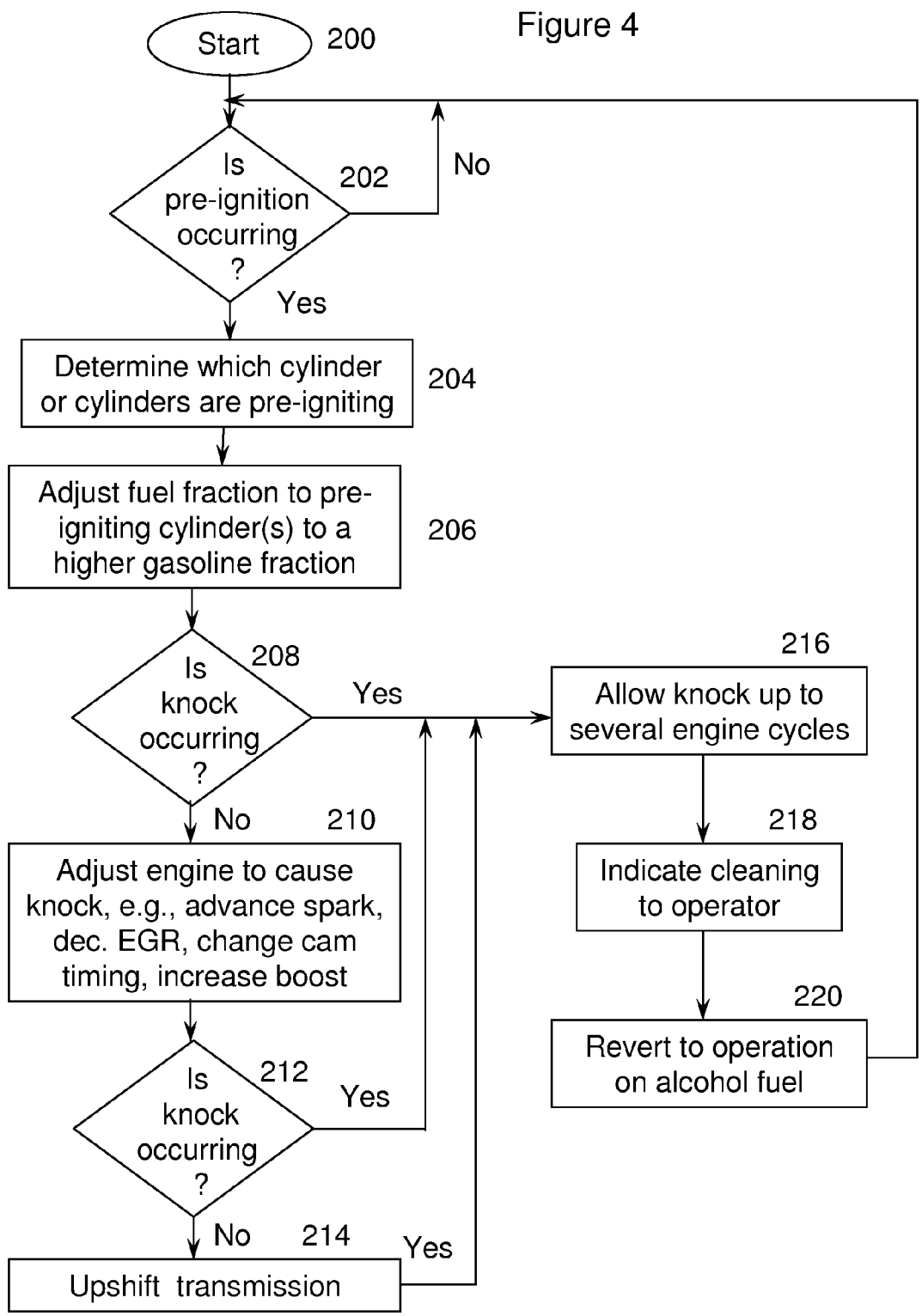

Referring to FIG. 4, a pre-ignition prevention method is shown starting in block 200. In block 202, occurrence of pre-ignition is evaluated. If no pre-ignition, normal engine operation continues. If pre-ignition is determined, control passes to block 204 in which the cylinders suffering from pre-ignition are determined. It is envisioned that blocks 202 and 204 can be combined. Control passes to block 206 in which the fuel being supplied to the pre-igniting cylinders is switched toward a higher content of gasoline fuel. It is anticipated that by increasing the proportion of gasoline fuel leads to autoignition because the alcohol fuel is typically substituted for the gasoline fuel specifically to avoid knock. Whether knock is occurring is detected in block 208. If such knock does not occur, control passes to block 210 in which one or more engine parameters are adjusted to favor knock: advance spark, reduce % EGR, adjust cam timing to improve scavenging, increase boost, etc. Implicit in all adjustments is that the torque supplied to the wheels of the vehicle match that demanded by the operator of the vehicle. If knock is still not occurring, the transmission can be upshifted to increase the likelihood of knock, shown in FIG. 4 as block 214. An upshift is a gear change to a higher gear (e.g., from $4^{th}$ to $5^{th}$ gear) the ratio of engine speed to vehicle speed is reduced. A transmission shift is noticeable to the operator of the vehicle and to be avoided. Thus, this is envisioned as a last resort to attain the knocking condition desired. When knock is occurring, as an output of blocks 208, 212, or 214, the cylinders are allowed to knock for as few as one engine cycle and as many as hundreds of engine cycles. If the induced knock is mild knock, which is desirable to avoid heavy knock which can lead to engine damage, it is likely that the knock only occurs in a fraction of the cycles. Thus, it may be necessary to operate for a period of time at the knocking condition to achieve the desired scrubbing of the combustion chamber surfaces: piston top, cylinder head, valves, etc. During this time, control passes to block 218 in which the operator of the vehicle is notified that the engine is undergoing a cleaning process. It is generally understood by vehicle operators that long term knock is undesirable and to be avoided. It is also known by those skilled in the art that mild knock has some beneficial attributes. To allay operator concerns about the knock, it is desirable to communicate to the operator that the knock occurring as a result of the cleaning cycle is normal and temporary. After the cleaning cycle has been performed, control passes to block 220 where normal operation with ethanol fuel is resumed. Engine and transmission parameters which were adjusted are returned to normal operation for the current engine speed and torque conditions. The end of the method occurs when control passes to block 222.

Determination of which cylinder or cylinders pre-igniting, as shown in block 204 of FIG. 4, is optional. Depending on the sensors available on a particular engine, determination of the pre-igniting cylinders may not be possible or may be insufficiently accurate to be relied upon. If such determination can be made reliably, there are parameters which can be adjusted on an individual cylinder basis. Specifically, fuel content (block 206) and spark advance (210) can be adjusted for each cylinder individually. The other engine and transmission parameters affect the entire engine, although some parameters may be adjusted differently bank to bank on a multibank engine, such as a vee engine. For example, cam timing can be adjusted differently on each bank. An engine with cylinder-by-cylinder control of valve events can be adjusted can provide the desired cylinder-by-cylinder adjustment. Other engine parameters, such as gear ratio selected in the transmission and intake boost apply to the entire engine. As mentioned above, the torque desired by the operator of the vehicle is supplied by the engine throughout all the adjustments described in conjunction with FIG. 4. However, there is no limitation that each cylinder must provide roughly the desired torque divided by the number of cylinders. Instead, some cylinders may be caused to provide higher torque than other cylinders with the constraint that the torque provided by the sum of the cylinders substantially match the operator's desire.

According to an aspect of the present invention, the dual-fuel engine uses a predominantly gasoline fuel which may contain up to 15% alcohol and a predominantly alcohol fuel which may contain up to 25% gasoline, herein referred to gasoline fuel and alcohol fuel, with the understanding that both fuels may be blends. The alcohol comprises any alcohol: methanol, ethanol, propanol, etc. or blend thereof.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

I claim:

1. An internal combustion engine system, comprising:
 an engine cylinder;
 a direct injector coupled to said cylinder;
 a port injector coupled to an engine intake, said engine intake communicating with said cylinder via an intake valve; and
 an electronic control unit electronically coupled to the engine, said port injector, and said direct injector, said electronic control unit determining whether pre-ignition is occurring and in response to occurrence of pre-ignition adjusting injection timing of said direct injector toward a time when a piston in said cylinder is nearest said injector to cause fuel from said direct injector to impact a top of said piston wherein said direct injector supplies fuel with greater than 75% alcohol content and said port injector supplies fuel with less than 15% alcohol content and said electronic control unit increasing an amount of fuel supplied by said port injector and decreasing an amount of fuel supplied by said direct injector in response to pre-ignition in said cylinder.

2. The engine of claim 1, further comprising:
 a flywheel sensor electronically coupled to said electronic control unit basing said determination of pre-ignition on a signal from said flywheel sensor.

3. The engine of claim 1 wherein said increasing of fuel supplied by said port injector is accomplished only in cylinders in which pre-ignition is occurring.

4. The engine of claim 1, wherein the electronic control unit commands an engine cleaning cycle in response to pre-ignition.

5. The engine of claim 1 wherein said injection timing is approximately centered around the time when the piston is at top dead center during valve overlap.

6. The engine of claim 1 wherein occurrence of pre-ignition is estimated based on engine operating conditions.

7. The engine of claim 1 wherein detection of pre-ignition is based on fuel characteristics.

\* \* \* \* \*